US012572957B2

(12) United States Patent　　　　　(10) Patent No.:　US 12,572,957 B2
Majdabadi et al.　　　　　　　　　　　(45) Date of Patent:　　Mar. 10, 2026

(54) TARGET CONTENT PERSONALIZATION IN OUTDOOR DIGITAL DISPLAY

(71) Applicant: INTERNATIONAL BUSINESS MACHINES CORPORATION, Armonk, NY (US)

(72) Inventors: Hamid Majdabadi, Ottawa (CA); Jeremy R. Fox, Georgetown, TX (US); Zachary A. Silverstein, Georgetown, TX (US); Su Liu, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 4 days.

(21) Appl. No.: 18/498,352

(22) Filed: Oct. 31, 2023

(65) Prior Publication Data

US 2025/0139665 A1　　May 1, 2025

(51) Int. Cl.
　　*G06Q 30/0251*　　(2023.01)
　　*G06F 3/14*　　(2006.01)

(52) U.S. Cl.
　　CPC ........... *G06Q 30/0261* (2013.01); *G06F 3/14* (2013.01)

(58) Field of Classification Search
　　CPC ....... G06Q 30/0261; G06Q 30/0207–30/0277; G06F 3/14
　　See application file for complete search history.

(56) References Cited

U.S. PATENT DOCUMENTS

| 10,694,262 | B1 * | 6/2020 | Hedman | .......... H04N 21/44008 |
| 10,762,527 | B1 | 9/2020 | Pittman | |
| 10,769,667 | B2 | 9/2020 | Zavesky | |
| 11,587,119 | B2 | 2/2023 | Wan | |

(Continued)

FOREIGN PATENT DOCUMENTS

CN　　　　110661825 B　*　7/2022　　......... G06Q 30/0267

OTHER PUBLICATIONS

A. Belov and Y. Abramov, "Approach for Increasing the Adaptability of Digital Outdoor Advertising," 2020 IEEE International IOT, Electronics and Mechatronics Conference (IEMTRONICS), Vancouver, BC, Canada, 2020, pp. 1-5, doi: 10.1109/IEMTRONICS51293. 2020.9216338. (Year: 2020).*

(Continued)

*Primary Examiner* — Waseem Ashraf
*Assistant Examiner* — Scott Snider
(74) *Attorney, Agent, or Firm* — Robert R. Aragona

(57)　　　　　　ABSTRACT

An embodiment for personalizing target content in an outdoor digital display is provided. The embodiment may include receiving an opt-in from a user and digital out-of-home (DOOH) content from one or more IoT-enabled digital displays within a pre-defined range of the user. The embodiment may also include causing a mobile device of the user to connect to the one or more IoT-enabled digital displays within the pre-defined range. The embodiment may further include identifying one or more target interest parameters associated with the user. The embodiment may also include in response to determining the DOOH content from at least (Continued)

300 one IoT-enabled digital display of the one or more IoT-enabled digital displays is relevant to the user, displaying the DOOH content from the at least one IoT-enabled digital display that is relevant to the user on the connected mobile device of the user.

14 Claims, 3 Drawing Sheets

(56)                    References Cited

U.S. PATENT DOCUMENTS

| | | | |
|---|---|---|---|
| 2008/0091541 A1 | 4/2008 | Law | |
| 2016/0292744 A1 | 10/2016 | Strimaitis | |
| 2017/0228788 A1* | 8/2017 | Rider | G06Q 30/0265 |
| 2019/0007356 A1* | 1/2019 | Loi | H04L 67/535 |
| 2020/0050906 A1* | 2/2020 | Mathai | G06V 20/20 |
| 2020/0184518 A1* | 6/2020 | Bains | G06Q 10/00 |
| 2020/0236427 A1* | 7/2020 | Nagar | H04N 21/44218 |
| 2020/0250706 A1* | 8/2020 | Avetisian | G06K 19/06028 |
| 2021/0133810 A1* | 5/2021 | Macneille | G06Q 30/0241 |
| 2022/0155093 A1* | 5/2022 | Fear | G01C 21/3679 |
| 2022/0309333 A1* | 9/2022 | Souche | G06Q 30/0224 |
| 2023/0070891 A1 | 3/2023 | Schroeter | |
| 2023/0120933 A1* | 4/2023 | Kim | B60W 40/02 |
| | | | 345/633 |

OTHER PUBLICATIONS

"Natural Language Processing", Wikipedia, Jul. 15, 2023, https://en.wikipedia.org/w/index.php?title=Natural_language_processing&oldid=1165518552 (Year: 2023).*

Langley, P. and Carbonell, J.G. (1984), Approaches to machine learning. J. Am. Soc. Inf. Sci., 35: 306-316. https://doi.org/10.1002/asi.4630350509 (Year: 1984).*

T. Intasuwan, J. Kaewthong and S. Vittayakorn, "Text and Object Detection on Billboards," 2018 10th International Conference on Information Technology and Electrical Engineering (ICITEE), Bali, Indonesia, 2018, pp. 6-11, doi: 10.1109/ICITEED.2018.8534879 (Year: 2018).*

Chavan, S., Kerr, D., Coleman, S., & Khader, H. (2021). Billboard Detection in the Wild. In Irish Machine Vision and Image Process-ing Conference Proceedings 2021—DCU, Ireland (2021 ed., pp. 57-64). Irish Pattern Recognition and Classification Society. (Year: 2021).*

Berstein, "Creative Ways to Advertise: how to Connect Out-of-Home to Your Mobile Advertising", https://www.vistarmedia.com/blog/creative-ways-to-advertise-dooh-mobile, Jul. 20, 2022, 7 Pages.

Germain, "Digital Billboards Are Tracking are Tracking You. And They Really, Really Want You to See Their Ads", Consumer Reports, Nov. 20, 2019, 15 Pages. https://www.consumerreports.org/electronics-computers/privacy/digital-billboards-are-tracking-you-and-they-want-you-to-see-their-ads-a1117246807/.

Grandview Research, Digital Out-of-home Advertising Market Size, Share & Trends Analysis Report by Format (Billboards, Street Furniture, Transit & Transportation, Place-Based Media), by Application, by Industry Vertical, by Region, and Segment Forecasts, https://www.grandviewresearch.com/industry-analysis/digital-out-of-home-advertising-market-report, Accessed on Aug. 14, 2023, 12 pp. 2023-2030.

IBM, "Advertising Accelerator", https://www.ibm.com/products/weather-company-advertising-accelerator, Accessed on Aug. 14, 2023, 11 Pages.

IBM, "Audi connects with drivers on their terms", https://www.ibm.com/case-studies/audi-watson-advertising, Accessed on Aug. 14, 2023, 5 Pages.

IBM, "IBM Maximo Visual Inspection", https://www.ibm.com/products/maximo/visual-inspection, Accessed on Aug. 14, 2023, 7 Pages.

IBM, "IBM Watson Discovery", https://www.ibm.com/products/watson-discovery, Accessed on Aug. 14, 2023, 13 Pages.

IBM, "Watson Assistant Build Better Virtual Agents, powered by AI", https://www.ibm.com/products/watson-assistant, Accessed on Aug. 14, 2023, 20 Pages.

Intasuwan, et al., "Text and Object Detection on Billboards", 2018 10th International Conference on Information Technology and Electrical Engineering (ICITEE), Downloaded on Aug. 14, 2020, 6 Pages. https://ieeexplore.ieee.org/stamp/stamp.jsp?tp=&arnumber=8534879.

Xavier, "Automatic Detection and Recognition of Text in Traffic Sign Boards based on Word Recognizer", IJIRST—International Journal for Innovative Research in Science & Technology, vol. 3, Issue 04, Sep. 2016, pp. 223-231.

* cited by examiner

100

COMPUTER 101

PROCESSOR SET 110

PROCESSING CIRCUITRY 120 CACHE 121

COMMUNICATION FABRIC 111

VOLATILE MEMORY 112

PERSISTENT STORAGE 113

OPERATING SYSTEM 122

CONTENT PERSONALIZATION PROGRAM 150

PERIPHERAL DEVICE SET 114

UI DEVICE SET 123 STORAGE 124 IoT SENSOR SET 125

NETWORK MODULE 115

END USER DEVICE 103

REMOTE SERVER 104

REMOTE DATABASE 130

WAN 102

PRIVATE CLOUD 106

GATEWAY 140

PUBLIC CLOUD 105

CLOUD ORCHESTRATION MODULE 141 HOST PHYSICAL MACHINE SET 142

VIRTUAL MACHINE SET 143 CONTAINER SET 144

FIG. 1

TARGET CONTENT PERSONALIZATION IN OUTDOOR DIGITAL DISPLAY

BACKGROUND

The present invention relates generally to the field of computing, and more particularly to a system for personalizing target content in an outdoor digital display.

Digital out-of-home (DOOH) advertising is a marketing channel where promotional media is dynamically and digitally displayed in outdoor public spaces. Brands reach audiences in public environments including digital billboards, outdoor screens, and/or on a network of screens. DOOH advertising involves e-displaying dynamic promotional media such as videos, animations, and brand advertisements. For example, the promotional media may be displayed at stadiums, arenas, airports, and shopping centers. Real-time DOOH advertising is increasingly becoming the focus of brands seeking to display their products and/or services.

SUMMARY

According to one embodiment, a method, computer system, and computer program product for personalizing target content in an outdoor digital display is provided. The embodiment may include receiving an opt-in from a user and digital out-of-home (DOOH) content from one or more IoT-enabled digital displays within a pre-defined range of the user. The embodiment may also include causing a mobile device of the user to connect to the one or more IoT-enabled digital displays within the pre-defined range. The embodiment may further include identifying one or more target interest parameters associated with the user contained in a profile of the user. The embodiment may also include in response to determining the DOOH content from at least one IoT-enabled digital display of the one or more IoT-enabled digital displays is relevant to the user based on the identified one or more target interest parameters, displaying the DOOH content from the at least one IoT-enabled digital display that is relevant to the user on the connected mobile device of the user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 illustrates an exemplary computing environment according to at least one embodiment.

DETAILED DESCRIPTION

Figure 2:
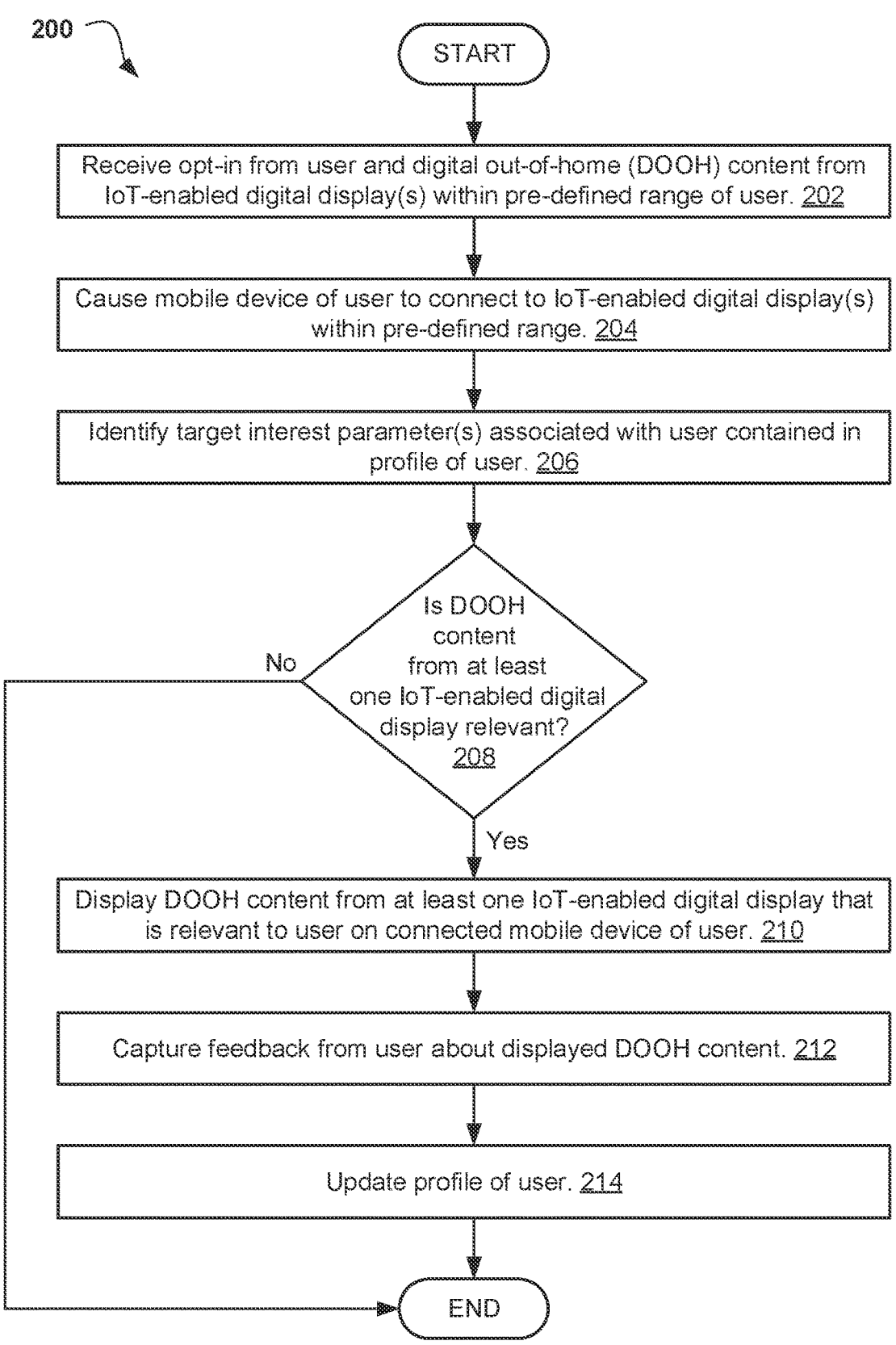
FIG. 2 illustrates an operational flowchart for personalizing target content in an outdoor digital display in a target content personalization process according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for personalizing target content in an outdoor digital display. The following described exemplary embodiments provide a system, method, and program product to, among other things, determine whether digital out-of-home (DOOH) content from at least one IoT-enabled digital display is relevant to a user based on one or more target interest parameters and, accordingly, display the DOOH content from the at least one IoT-enabled digital display that is relevant to the user on a connected mobile device of the user. Therefore, the present embodiment has the capacity to improve DOOH technology by capturing and communicating DOOH content in a secure messaging environment.

As previously described, DOOH advertising is a marketing channel where promotional media is dynamically and digitally displayed in outdoor public spaces. Brands reach audiences in public environments including digital billboards, outdoor screens, and/or on a network of screens. DOOH advertising involves e-displaying dynamic promotional media such as videos, animations, and brand advertisements. For example, the promotional media may be displayed at stadiums, arenas, airports, and shopping centers. Real-time DOOH advertising is increasingly becoming the focus of brands seeking to display their products and/or services. Many DOOH advertisements are fleeting in nature and the exposure time is limited. This problem is typically addressed by automatically connecting a billboard with a product website instantly. However, automatically connecting a billboard with a product website fails to correlate target interest parameters of a user with DOOH content.

It may therefore be imperative to have a system in place to correlate target interest parameters of a user with DOOH content. Thus, embodiments of the present invention may provide advantages including, but not limited to, capturing and communicating DOOH content in a secure messaging environment, increasing the exposure time to DOOH content, and notifying a user about relevant DOOH content in a secure messaging environment. The present invention does not require that all advantages need to be incorporated into every embodiment of the invention.

According to at least one embodiment, when a user is outdoors, an opt-in from the user and DOOH content from one or more IoT-enabled digital displays within a pre-defined range of the user may be received in order to cause a mobile device of the user to connect to the one or more IoT-enabled digital displays within the pre-defined range. Upon causing the mobile device of the user to connect, one or more target interest parameters associated with the user contained in a profile of the user may be identified so that it may be determined whether the DOOH content from at least one IoT-enabled digital display of the one or more IoT-enabled digital displays is relevant to the user based on the identified one or more target interest parameters. According to at least one embodiment, the target interest parameter may be a scheduled transaction. According to at least one other embodiment, the target interest parameter may be an upcoming reminder. According to at least one further embodiment, the target interest parameter may be a preference. Then, in response to determining the DOOH content from the at least one IoT-enabled digital display is relevant, the DOOH content from the at least one IoT-enabled digital display that is relevant to the user may be displayed on the connected mobile device of the user such that feedback may be captured from the user about the displayed DOOH content. Upon capturing the feedback, the profile of the user may be updated based on the captured feedback.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to determine whether digital out-of-home (DOOH) content from at least one IoT-enabled digital display is relevant to a user based on one or more target interest parameters and, accordingly, display the DOOH content from the at least one IoT-enabled digital display that is relevant to the user on a connected mobile device of the user.

Referring to FIG. 1, an exemplary computing environment 100 is depicted, according to at least one embodiment. Computing environment 100 contains an example of an environment for the execution of at least some of the computer code involved in performing the inventive methods, such as a content personalization program 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage 113 allows writing of data, deletion of data and re-writing of data. Some familiar forms of persistent storage 113 include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

Peripheral device set 114 includes the set of peripheral devices of computer 101. Data communication connections between the peripheral devices 114 and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector. Peripheral device set 114 may also include a GPS device, a camera, a digital display device, and/or optical sensors.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments the private cloud 106 may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the content personalization program 150 may be a program capable of receiving an opt-in from a user and DOOH content from one or more IoT-enabled digital displays within a pre-defined range of the user, determining whether the digital out-of-home (DOOH) content from at least one IoT-enabled digital display is relevant to a user based on one or more target interest parameters, displaying the DOOH content from the at least one IoT-enabled digital display that is relevant to the user on a connected mobile device of the user, capturing and communicating the DOOH content in a secure messaging environment, increasing the exposure time to the DOOH content, and notifying the user about relevant DOOH content in the secure messaging environment. Furthermore, notwithstanding depiction in computer 101, the content personalization program 150 may be stored in and/or executed by, individually or in any combination, end user device 103, remote server 104, public cloud 105, and private cloud 106. The content personalization method is explained in further detail below with respect to FIG. 2. It may be appreciated that the examples described below are not intended to be limiting, and that in embodiments of the present invention the parameters used in the examples may be different.

Referring now to FIG. 2, an operational flowchart for personalizing target content in an outdoor digital display in a target content personalization process 200 is depicted according to at least one embodiment. At 202, the content personalization program 150 receives the opt-in from the user and the DOOH content from the one or more IoT-enabled digital displays within the pre-defined range of the user. As used herein, "DOOH content" means content (e.g., text and images) from any digitized display that can be seen on the street and/or at a public gathering. For example, the DOOH content may be displayed on highway billboards and/or subway platforms.

The opt-in from the user may be an agreement by the user to capture and receive notifications about relevant DOOH content while travelling through physical spaces. For example, the user may opt-in to receive notifications while taking public transit. In another example, the user may opt-in to receive notifications while driving on a highway. The opt-in may be provided on a mobile device of the user, such as a smartphone, smartwatch, and/or augmented reality (AR) headset of the user.

Examples of the IoT-enabled digital display may include, but are not limited to, highway billboards, on-car displays (e.g., atop taxi cabs), and/or screens at bus stop shelters or subway platforms. According to at least one embodiment, the pre-defined range of the user may be a field of view (FOV) of the user. For example, the DOOH content from the one or more IoT-enabled digital displays may be received when the user can physically see the DOOH content in their surroundings. According to at least one other embodiment, the pre-defined range of the user may be a threshold distance in which IoT devices may communicate. For example, the DOOH content from the one or more IoT-enabled digital displays may be received when the mobile device of the user is within 30 feet of the one or more IoT-enabled digital displays. In either embodiment, the DOOH content may be captured by one or more optical sensors and/or a camera embedded in the mobile device of the user and/or the one or more IoT-enabled digital displays.

Then, at 204, the content personalization program 150 causes the mobile device of the user to connect to the one or more IoT-enabled digital displays within the pre-defined range. The mobile device may be connected to the one or more IoT-enabled digital displays by one or more wireless technologies. Upon connecting to the one or more IoT-enabled digital displays, the content personalization program 150 may assign an Advertising ID to the mobile device. The Advertising ID may then be sent to a third party which can use this unique ID to track usage of applications by the user. The Advertising ID may be assigned based on a media access control (MAC) address and wireless signature of the mobile device.

Next, at 206, the content personalization program 150 identifies the one or more target interest parameters associated with the user contained in the profile of the user. Examples of the target interest parameter may include, but are not limited to, a scheduled transaction of the user, an upcoming reminder of the user, a preference of the user, and/or an online activity of the user.

For example, the scheduled transaction of the user may be a bill payment for which the user is enrolled in autopay. The upcoming reminder of the user may be a sporting event which the user will attend. The preference of the user may be the type of DOOH content the user enjoys, such as whether the user prefers graphical images or text. The online activity of the user may be interactions between the user and applications on the mobile device.

As described above, the one or more target interest parameters are contained in the profile of the user. Upon a first iteration of the target content personalization process 200, the profile may be generated by the content personalization program 150 to include the one or more target interest parameters. The profile may be stored in a knowledge corpus, such as remote database 130. The profile may be generated by applying one or more machine learning (ML) techniques, such as supervised and/or unsupervised learning, on the one or more target interest parameters. After the first iteration of the target content personalization process 200, the profile may be obtained from the knowledge corpus and updated accordingly, described in further detail below with respect to step 214.

According to at least one embodiment, the content personalization program 150 may be trained to detect the one or more target interest parameters utilizing recurrent neural networks.

Then, at 208, the content personalization program 150 determines whether the DOOH content from the at least one IoT-enabled digital display of the one or more IoT-enabled digital displays is relevant to the user. The determination is made based on the identified one or more target interest parameters. In order to correlate the identified one or more target interest parameters with the DOOH content as the mobile device of the user captures the DOOH content when the user travels through the physical spaces, one or more machine learning algorithms may be used. For example, the user may be an avid traveler who frequently uses public transportation and is exposed to a variety of DOOH content on digital screens located at a train or subway platform. Continuing the example, as the user walks through the train or subway platform, the mobile device may capture the DOOH content. In another example, the user may be a commuter who frequently drives to work and is exposed to a variety of DOOH content on digital billboards located along the highway. Continuing the example, as the user drives along the highway, the mobile device such as a dashboard camera may capture the DOOH content.

According to at least one embodiment, a computer vision algorithm, such as convolutional neural networks (CNNs), may detect one or more objects in the DOOH content. For example, the one or more objects in the DOOH content may include a ticket to a sporting event, a coupon to pay a bill, and/or a movie poster.

According to at least one other embodiment, a natural language processing (NLP) algorithm, such as part-of-speech tagging, lemmatization, topic modelling, and/or keyword extraction, may process text in the DOOH content. For example, the text in the DOOH content may include the time and location of the sporting event, the amount of the coupon to pay the bill (e.g., 25% off), and/or the title of the movie.

In either embodiment, the detected one or more objects and the processed text in the DOOH content may be compared with the identified one or more target interest parameters. For example, the image of the ticket to the sporting event and the text regarding the time and location of the sporting event in the DOOH content may be compared with the sporting event the user will attend contained in the profile. Continuing the example, where the image and text in the DOOH content (e.g., image and text relating to a baseball game) match the target interest parameter (e.g., that the user will attend a baseball game), the DOOH content may be classified as relevant to the user. In another example, the image of the coupon to pay the bill and the text regarding the amount of the coupon in the DOOH content may be compared with the bill payment contained in the profile. Continuing the example, where the image and text in the DOOH content (e.g., image and text relating to a cable bill) match the target interest parameter (e.g., that payment of the cable bill is due), the DOOH content may be classified as relevant to the user. In another example, the image of the movie poster and the text regarding the title of the movie may be compared with the online activity of the user contained in the profile. Continuing the example, where the image and text in the DOOH content (e.g., image and text relating to a comedy movie) match the target interest parameter (e.g., that the user streams comedy movies on their mobile device), the DOOH content may be classified as relevant to the user.

In response to determining the DOOH content from the at least one IoT-enabled digital display is relevant (step 208, "Yes" branch), the target content personalization process 200 proceeds to step 210 to display the DOOH content from the at least one IoT-enabled digital display that is relevant to the user on the connected mobile device of the user. In response to determining the DOOH content from the at least one IoT-enabled digital display is not relevant (step 208, "No" branch), the target content personalization process 200 ends.

Next, at 210, the content personalization program 150 displays the DOOH content from the at least one IoT-enabled digital display that is relevant to the user on the connected mobile device of the user. The relevant DOOH content may be sent to the mobile device based on the Advertising ID in a secure manner via token-based authentication to authenticate the user. For example, where the user walks through the physical space, such as a train or subway platform, the relevant DOOH content may be displayed on a smartphone, smartwatch, and/or AR headset of the user. In another example, where the user drives along the highway, the relevant DOOH content may be displayed on the dashboard camera and/or the in-dashboard navigation screen of the vehicle.

According to at least one embodiment, displaying the DOOH content from the at least one IoT-enabled digital display that is relevant to the user may include adapting the displayed DOOH content based on the one or more preferences of the user contained in the profile of the user. The displayed DOOH content may be adapted by collaborative filtering. As described above with respect to step 206, the preference of the user may be the type of DOOH content the user enjoys, such as whether the user prefers graphical images or text.

Additional preferences may include, but are not limited to, brightness of the DOOH content, color of the DOOH content, and/or zoom level of the DOOH content. For example, the DOOH content that is displayed on the mobile device of the user may be adapted from image to text where the user prefers text. Contrarily, the DOOH content that is displayed on the mobile device of the user may be adapted from text to images where the user prefers graphical images. In another example, where the user prefers a brightness level of 50% and the original DOOH content is displayed at a brightness level of 80%, the DOOH content that is displayed on the mobile device of the user may be adapted from 80% to 50%.

Then, at 212, the content personalization program 150 captures the feedback from the user about the displayed DOOH content. The feedback may be captured by the mobile device of the user in response to prompting the user for the feedback by a pop-up or AR overlay. According to at least one embodiment, the captured feedback may be negative feedback in the form of a thumbs-down gesture from the user. According to at least one other embodiment, the captured feedback may be positive feedback in the form of a thumbs-up gesture by the user.

Next, at 214, the content personalization program 150 updates the profile of the user based on the captured feedback. According to at least one embodiment, where the captured feedback is the negative feedback, the profile may be updated to include the negative feedback associated with the particular DOOH content. In this manner, the DOOH content that received the negative feedback may not be displayed to the user in the future. For example, where the DOOH content including the movie poster received negative feedback, that movie poster may not be displayed to the user in the future. According to at least one other embodiment, where the captured feedback is the positive feedback, the profile may be updated to include the positive feedback associated with the particular DOOH content. In this manner, the DOOH content that received the positive feedback may be displayed to the user in the future. For example, where the DOOH content including the coupon to pay the bill received positive feedback, that coupon may be displayed to the user in the future.

Figure 3:
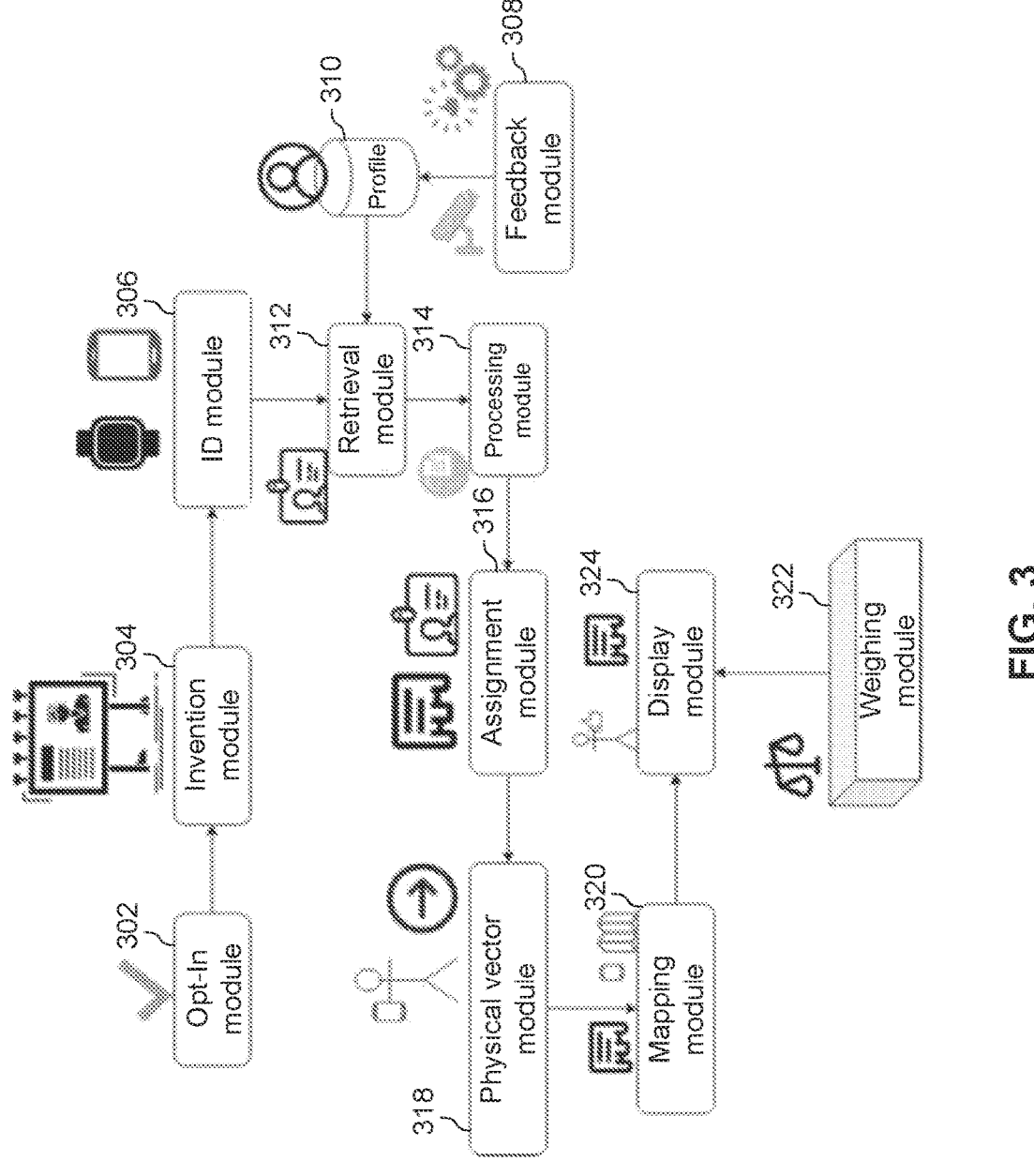
FIG. 3 is an exemplary diagram depicting an interaction between solution components of the process in FIG. 2 according to at least one embodiment.

Referring now to FIG. 3, an exemplary diagram 300 depicting an interaction between solution components of the process in FIG. 2 is shown according to at least one embodiment. In the diagram 300, an opt-in module 302 may receive the opt-in from the user. An invention module 304 may integrate and accept the DOOH content. An ID module 306 may form the Advertising ID for the mobile device of the user based on the MAC address and wireless signature. A feedback module 308 may upload user feedback to the profile of the user 310. The user feedback from the feedback module 308 may be in the form of positive feedback or negative feedback. A retrieval module 312 may obtain the profile of the user 310 from the knowledge corpus. A processing module 314 may process the DOOH content using one or more ML techniques. An assignment module 316 may send the DOOH content to the mobile device of the user based on the Advertising ID. A physical vector module 318 may track the movements of the user through physical spaces. A mapping module 320 may maintain a mapping of a location of an approaching user and signal strength between the mobile device and the one or more IoT-enabled digital displays. A weighing module 322 may weigh specific DOOH content based on the presence of multiple users, devices, and shared interests. Finally, a display module 324 may display the relevant DOOH content on the mobile device of the user as the user moves through the physical spaces.

It may be appreciated that FIGS. 2 and 3 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of personalizing target content in an outdoor digital display, the method comprising:

receiving an opt-in from a user and digital out-of-home (DOOH) content from one or more Internet of Things (IoT)-enabled digital displays within a pre-defined range of the user, wherein the one or more IoT-enabled digital displays include a digital screen on a subway platform;

causing a mobile device of the user to connect to the one or more IoT-enabled digital displays within the pre-defined range including the digital screen on the subway platform;

identifying one or more target interest parameters associated with the user contained in a profile of the user, wherein identifying the one or more target interest parameters further comprises:

training a recurrent neural network (RNN) to detect the one or more target interest parameters, wherein the RNN is trained to detect a scheduled transaction of the user for which the user is enrolled in autopay; and utilizing the trained RNN to generate the profile of the user that contains the one or more target interest parameters;

determining whether the DOOH content from at least one IoT-enabled digital display of the one or more IoT-enabled digital displays is relevant to the user based on the identified one or more target interest parameters, wherein the DOOH content from the at least one IoT-enabled digital display includes content displayed on the digital screen on the subway platform captured by a camera embedded in an augmented reality (AR) device of the user, wherein determining whether the DOOH content from the at least one IoT-enabled digital display is relevant to the user further comprises:

detecting, by a convolutional neural network (CNN), one or more objects in the DOOH content from the digital screen on the subway platform, wherein the CNN detects a coupon in the DOOH content associated with the scheduled transaction;

processing, by natural language processing (NLP), text in the DOOH content from the digital screen on the subway platform; and comparing the detected one or more objects and the processed text in the DOOH content from the digital screen on the subway platform with the identified one or more target interest parameters, wherein the coupon is compared with the scheduled transaction; and in response to determining the DOOH content from the at least one IoT-enabled digital display is relevant, displaying the DOOH content from the at least one IoT-enabled digital display that is relevant to the user on the connected mobile device of the user, wherein the connected mobile device of the user displaying the relevant DOOH content includes the AR device of the user, wherein displaying the DOOH content from the at least one IoT-enabled digital display that is relevant to the user on the connected mobile device of the user further comprises:

adapting the displayed DOOH content on the connected mobile device of the user including the AR device of the user based on one or more preferences of the user contained in the profile of the user, wherein adapting the displayed DOOH content includes changing a brightness and a color of the DOOH content on the connected mobile device of the user.

2. The computer-based method of claim 1, further comprising:

capturing feedback from the user about the displayed DOOH content; and updating the profile of the user based on the captured feedback.

3. The computer-based method of claim 2, wherein capturing the feedback from the user about the displayed DOOH content further comprises:

capturing negative feedback in a form a thumbs-down by the user.

4. The computer-based method of claim 2, wherein capturing the feedback from the user about the displayed DOOH content further comprises:

capturing positive feedback in a form a thumbs-up by the user.

5. The computer-based method of claim 1, wherein the target interest parameter is selected from a group consisting of the scheduled transaction, an upcoming reminder, a preference, and an online activity.

6. A computer system, the computer system comprising:

one or more processors, one or more computer-readable memories, one or more computer-readable storage medium, and program instructions stored on at least one of the one or more computer-readable storage medium for execution by at least one of the one or more processors via at least one of the one or more computer-readable memories, wherein the computer system is capable of performing a method comprising:

receiving an opt-in from a user and digital out-of-home (DOOH) content from one or more Internet of Things (IoT)-enabled digital displays within a pre-defined range of the user, wherein the one or more IoT-enabled digital displays include a digital screen on a subway platform;

causing a mobile device of the user to connect to the one or more IoT-enabled digital displays within the pre-defined range including the digital screen on the subway platform;

identifying one or more target interest parameters associated with the user contained in a profile of the user, wherein identifying the one or more target interest parameters further comprises:

training a recurrent neural network (RNN) to detect the one or more target interest parameters, wherein the RNN is trained to detect a scheduled transaction of the user for which the user is enrolled in autopay; and utilizing the trained RNN to generate the profile of the user that contains the one or more target interest parameters;

determining whether the DOOH content from at least one IoT-enabled digital display of the one or more IoT-enabled digital displays is relevant to the user based on the identified one or more target interest parameters, wherein the DOOH content from the at least one IoT-enabled digital display includes content displayed on the digital screen on the subway platform captured by a camera embedded in an augmented reality (AR) device of the user, wherein determining whether the DOOH content from the at least one IoT-enabled digital display is relevant to the user further comprises:

detecting, by a convolutional neural network (CNN), one or more objects in the DOOH content from the digital screen on the subway platform, wherein the CNN detects a coupon in the DOOH content associated with the scheduled transaction;

processing, by natural language processing (NLP), text in the DOOH content from the digital screen on the subway platform; and comparing the detected one or more objects and the processed text in the DOOH content from the digital screen on the subway platform with the identified one or more target interest parameters, wherein the coupon is compared with the scheduled transaction; and in response to determining the DOOH content from the at least one IoT-enabled digital display is relevant, displaying the DOOH content from the at least one IoT-enabled digital display that is relevant to the user on the connected mobile device of the user, wherein the connected mobile device of the user displaying the relevant DOOH content includes the AR device of the user, wherein displaying the DOOH content from the at least one IoT-enabled digital display that is relevant to the user on the connected mobile device of the user further comprises:

adapting the displayed DOOH content on the connected mobile device of the user including the AR device of the user based on one or more preferences of the user contained in the profile of the user, wherein adapting the displayed DOOH content includes changing a brightness and a color of the DOOH content on the connected mobile device of the user.

7. The computer system of claim 6, the method further comprising:

capturing feedback from the user about the displayed DOOH content; and updating the profile of the user based on the captured feedback.

8. The computer system of claim 7, wherein capturing the feedback from the user about the displayed DOOH content further comprises:

capturing negative feedback in a form a thumbs-down by the user.

9. The computer system of claim 7, wherein capturing the feedback from the user about the displayed DOOH content further comprises:

capturing positive feedback in a form a thumbs-up by the user.

10. The computer system of claim 6, wherein the target interest parameter is selected from a group consisting of the scheduled transaction, an upcoming reminder, a preference, and an online activity.

11. A computer program product, the computer program product comprising:

one or more computer-readable storage medium and program instructions stored on at least one of the one or more computer-readable storage medium, the program instructions executable by a processor capable of performing a method, the method comprising:

receiving an opt-in from a user and digital out-of-home (DOOH) content from one or more Internet of Things (IoT)-enabled digital displays within a pre-defined range of the user, wherein the one or more IoT-enabled digital displays include a digital screen on a subway platform;

causing a mobile device of the user to connect to the one or more IoT-enabled digital displays within the pre-defined range including the digital screen on the subway platform;

identifying one or more target interest parameters associated with the user contained in a profile of the user, wherein identifying the one or more target interest parameters further comprises:

training a recurrent neural network (RNN) to detect the one or more target interest parameters, wherein the RNN is trained to detect a scheduled transaction of the user for which the user is enrolled in autopay; and utilizing the trained RNN to generate the profile of the user that contains the one or more target interest parameters;

determining whether the DOOH content from at least one IoT-enabled digital display of the one or more IoT-enabled digital displays is relevant to the user based on the identified one or more target interest parameters, wherein the DOOH content from the at least one IoT-enabled digital display includes content displayed on the digital screen on the subway platform captured by a camera embedded in an augmented reality (AR) device of the user, wherein determining whether the DOOH content from the at least one IoT-enabled digital display is relevant to the user further comprises:

detecting, by a convolutional neural network (CNN), one or more objects in the DOOH content from the digital screen on the subway platform, wherein the CNN detects a coupon in the DOOH content associated with the scheduled transaction;

processing, by natural language processing (NLP), text in the DOOH content from the digital screen on the subway platform; and comparing the detected one or more objects and the processed text in the DOOH content from the digital screen on the subway platform with the identified one or more target interest parameters, wherein the coupon is compared with the scheduled transaction; and in response to determining the DOOH content from the at least one IoT-enabled digital display is relevant, displaying the DOOH content from the at least one IoT-enabled digital display that is relevant to the user on the connected mobile device of the user, wherein the connected mobile device of the user displaying the relevant DOOH content includes the AR device of the user, wherein displaying the DOOH content from the at least one IoT-enabled digital display that is relevant to the user on the connected mobile device of the user further comprises:

adapting the displayed DOOH content on the connected mobile device of the user including the AR device of the user based on one or more preferences of the user contained in the profile of the user, wherein adapting the displayed DOOH content includes changing a brightness and a color of the DOOH content on the connected mobile device of the user.

12. The computer program product of claim 11, the method further comprising:

capturing feedback from the user about the displayed DOOH content; and updating the profile of the user based on the captured feedback.

13. The computer program product of claim 12, wherein capturing the feedback from the user about the displayed DOOH content further comprises:

capturing negative feedback in a form a thumbs-down by the user.

14. The computer program product of claim 12, wherein capturing the feedback from the user about the displayed DOOH content further comprises:

capturing positive feedback in a form a thumbs-up by the user.

\* \* \* \* \*